UNITED STATES PATENT OFFICE.

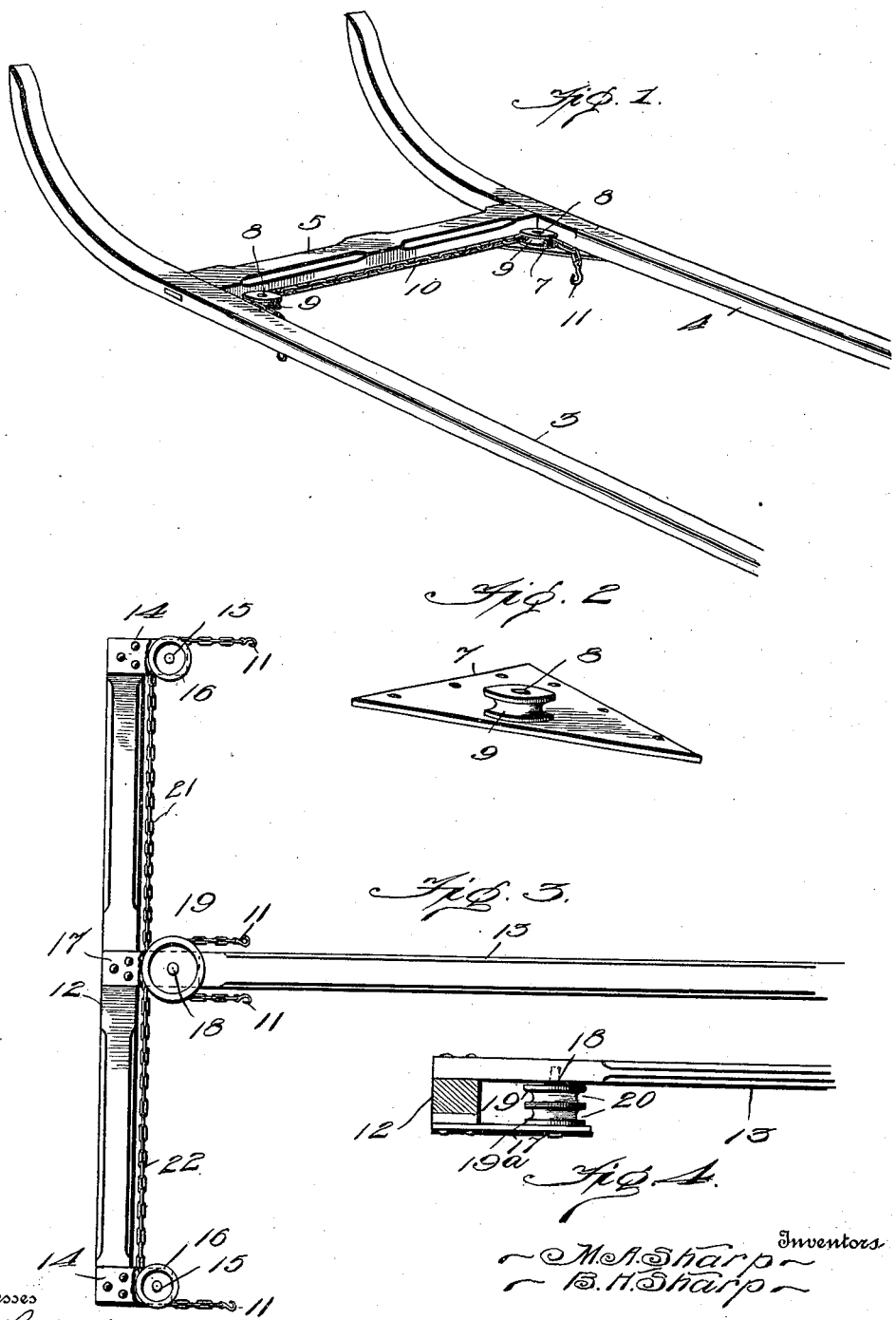

MARVIN A. SHARP, OF LAPORTE, AND BIRD H. SHARP, OF VICTORIA, TEXAS.

POLE OR SHAFT.

SPECIFICATION forming part of Letters Patent No. 685,067, dated October 22, 1901.

Application filed November 8, 1900. Serial No. 35,860. (No model.)

*To all whom it may concern:*

Be it known that we, MARVIN A. SHARP, a resident of Laporte, in the county of Harris, and BIRD H. SHARP, a resident of Victoria, in the county of Victoria, Texas, citizens of the United States, have invented new and useful Improvements in Poles or Shafts, of which the following is a specification.

Our invention relates to poles and shafts for vehicles; and its object is to provide simple and inexpensive means for dispensing with the singletree ordinarily employed with a pair of shafts or thills in a one-horse vehicle or the usual doubletree in a two-horse vehicle.

The construction of the improvement will be fully described hereinafter in connection with the accompanying drawings, which form a part of this specification.

In the drawings, Figure 1 is a view in perspective of the under side of a pair of vehicle-shafts equipped with our invention. Fig. 2 is a view in perspective of one of the pulley-supporting plates of the device detached. Fig. 3 is a bottom plan view of a vehicle tongue and cross-bar with our invention applied thereto, and Fig. 4 is a sectional view showing the tongue and the pulley arranged thereon in side elevation.

Referring to Figs. 1 and 2, the reference-numerals 3 and 4 designate the vehicle-shafts, connected by the usual cross-bar 5. 7 designates triangular plates secured to the shafts and cross-bar where the ends of the latter join the shafts. From the under surface of each of said plates projects a pin 8, upon which is mounted a pulley 9, which may be either plain or grooved. Around these pulleys passes a cable, chain, or leather cord 10, each end of which is provided with a hook 11 or like fastening device, to which the ends of the traces of the harness are to be attached. It will be apparent that when the traces are attached to the ends of the chain or cable they will yield readily to equalize the draft, and thus serve the purpose of the ordinary singletree, thus entirely obviating the use of the singletree.

In Figs. 3 and 4 we have shown an embodiment of the invention adapted for two-horse teams. In this application of the improvement a cross-bar 12 is secured rigidly to the rear end of the vehicle-tongue 13, and suitable plates 14 are secured to the ends of said bar. Pins 15 (corresponding to the pins 8 of Figs. 1 and 2) project from the plate 14, and upon each of said pins is mounted a grooved pulley 16. To the center of the cross-bar 12 is secured a plate 17, from which projects a vertical pin 18, upon which are mounted two pulleys 19 and 19ª, formed with grooves 20. 21 and 22 designate chains, cables, or other connections, the inner ends of which are passed around the central double pulley 19, while their outer ends each pass around one of the pulleys 15, as clearly shown in Fig. 3. The utility and operation of this modification of the improvement will be readily understood, and the required equalization of draft is effected without the employment of a singletree.

We claim—

The combination with a vehicle cross-bar, plates located on the ends of the cross-bar, a pin or bolt extending from each plate, a pulley on each pin or bolt, a flexible connection extending around the pulleys between the latter and the cross-bar, and means on the ends of the flexible connection whereby it is adapted to be connected to the traces.

In testimony whereof we affix our signatures in presence of two witnesses.

MARVIN A. SHARP.
BIRD H. SHARP.

Witnesses:
W. P. MURREY,
A. L. WELCH.